J. B. DUANE.
Grain Drill.
No. 30,212.
Patented Oct. 2, 1860.
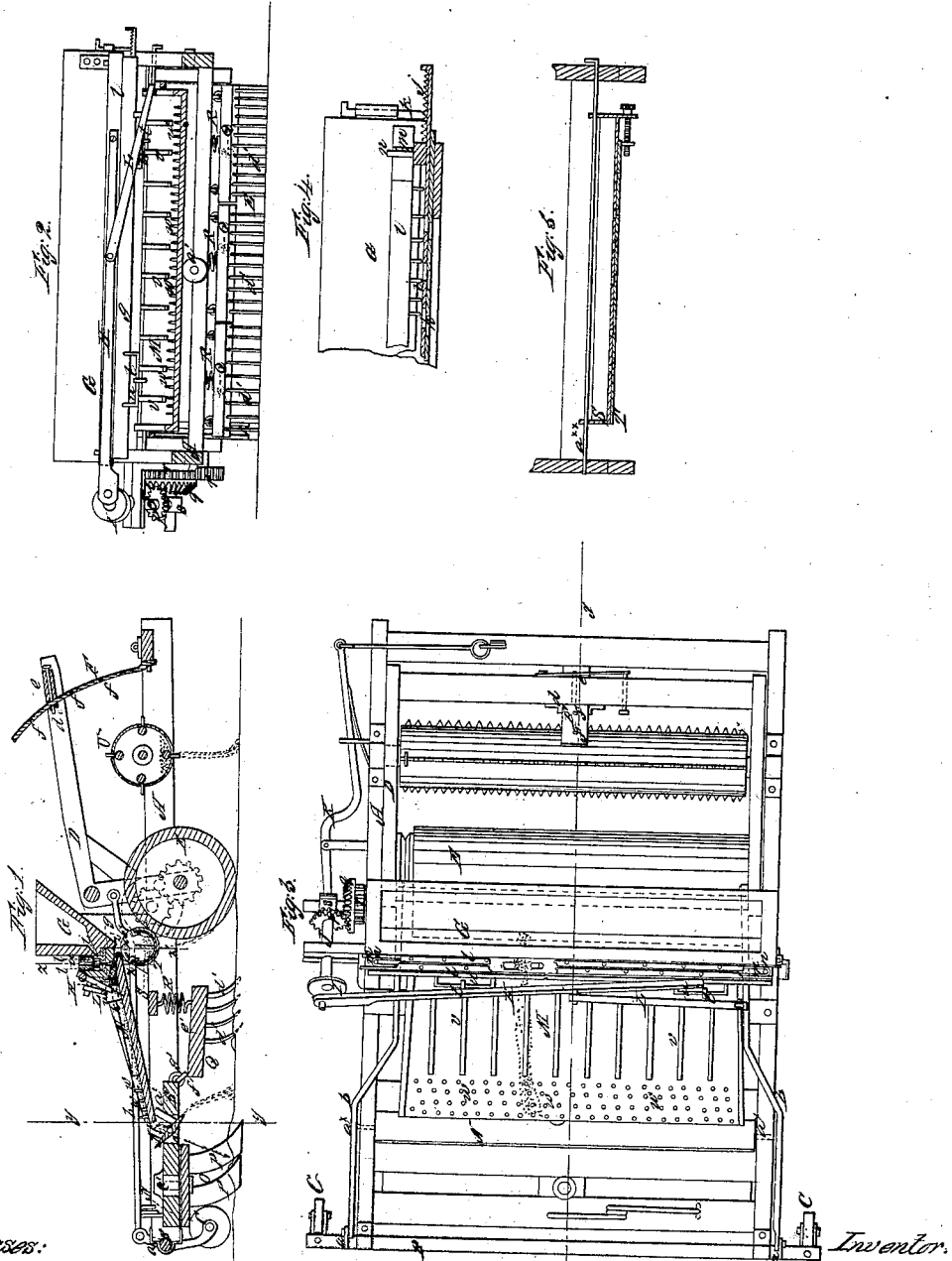

UNITED STATES PATENT OFFICE.

J. B. DUANE, OF SCHENECTADY, NEW YORK.

IMPROVEMENT IN SEEDING-MACHINES.

Specification forming part of Letters Patent No. 30,212, dated October 2, 1860.

*To all whom it may concern:*

Be it known that I, J. B. DUANE, of Schenectady, in the county of Schenectady and State of New York, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\ x$, Fig. 3; Fig. 2, a transverse vertical section of the same, taken in the line $y\ y$, Fig. 1; Fig. 3, a plan or top view of the same; Fig. 4, a detached sectional view of the principal seed-distributing device, taken in the line $z\ z$, Fig. 1; Fig. 5, a detached sectional view of the supplemental seed-distributing device, taken in the line $z'\ z'$, Fig. 1.

Similar letters of reference indicate corresponding parts in the several figures.

This invention is designed to sow seed broadcast on newly-turned sod without breaking or distributing the latter, and at the same time perform the work in a perfect manner and with a capability of freeing itself from all obstructions, and without being liable to choke or clog.

The invention is an improvement on a machine for which Letters Patent were granted to me April 12, 1859; and it consists in a novel and improved arrangement of the seed distributing apparatus, improved arrangement of drags, and a harrow, adjustable guide-board, and elevating device, substantially as hereinafter shown, whereby the desired result is obtained.

To enable those skilled in the art to fully understand and construct my invention, I will proceed to describe it.

A represents a rectangular frame, the front part of which has a shaft, B, secured to it transversely. To each end of this shaft B there is attached a caster-wheel, C, and to the shaft B there are attached two arms, $a\ a$, each of which has a rod, $b$, connected to its upper end. These rods $b\ b$ extend back one at each side of the frame A, and are connected at their back ends to a bent-lever frame, D, which is secured by fulcrum-pivots $c$ in the frame A.

In the front and lower part of the frame D there is placed a roller, E, which supports the back part of the machine, the caster-wheels C supporting the front part. The back and upper part of the frame D has a curved or segment bar, F, passing through a guide, $d$, which is attached to the frame D, and to said frame there is attached a spring-pin, $e$, which fits in either of a series of holes, $f$, in the bar F. By means of the pin $e$ the frame A may be elevated more or less, as desired, the depressing of the back end of frame D elevating frame A bodily, as the shaft B is turned simultaneously with the movement of frame D, owing to the connection of the former to the latter by the rods $b\ b$.

On the frame A there is placed transversely a hopper, G, which extends the whole width of the frame. The bottom $g$ of this hopper extends out in front of it, and has a perforated plate, $h$, fitted therein, directly over which there is a perforated plate, $i$, the latter plate being adjustable longitudinally and secured in proper position by a rack and stop, $j\ k$, as shown clearly in Fig. 4. The plates $h\ i$ are provided with almond-shaped perforations, as described in my previous patent formerly alluded to.

On the upper plate, $i$, there are placed two bars, $l\ l$, the lower edges of which are toothed. These bars are connected at their ends by straps $m\ m$, which pass around rods or pulleys $n\ n$ at the ends of the hopper G, as shown clearly in Fig. 3. The outermost bar $l$ is connected by a rod, H, to a crank-pulley, I, which is at the upper end of a shaft, J, which has its bearing $o$ attached to one end of the hopper G. The lower end of shaft J has a pinion, $p$, attached, and this pinion gears into a wheel, $q$, which is connected by gears $r\ r$ with the axis of the roller E, as shown in Fig. 2.

The lower end of shaft J is fitted in a movable step, $s$, which is placed on the axis of wheel $q$, and has a lever, K, attached to it for adjusting the pinion $p$ in and out of gear with wheel $q$.

To the rod H there is connected a rod, L, the outer end of which is attached to a board, M, the back part of which is suspended to the front edge of the bottom $g$ of the hopper G by eyes $t$, which are fitted on guides $u$, as shown clearly in Fig. 2. The board M extends nearly the whole width of the frame A, and it has strips or cleats $v$ attached to its upper surface, and also pins $w$, the latter being at its lower part, as shown in Figs. 1, 2, and 3. The board M is somewhat inclined, and extends under the front part of the bottom $g$ of the hopper G, the front part of said board resting on a friction-wheel, $a'$.

In the front part of the frame A and directly in front of the board M there is placed a guide-board, N. This board is quite narrow; but it extends the whole width of the frame, and is fitted on pivots $a^x$, between transverse boards $b'$ N' therein. To the under side of the board N' there is attached, by a bolt, $c'$, a harrow, O, the teeth P of which are of curved form, the rounded or convex surfaces of which are at their front sides, as shown clearly in Fig. 1.

Directly between the harrow O there are attached a series of drags, Q, the teeth $d'$ of which incline backward, as shown in Fig. 1. These teeth $d'$ are attached to boards $e'$, the front ends of which are provided with eyes $f'$, that are fitted on inclined loops or guides $g'$, attached to the board $b'$. (See Fig. 1.) Each board $e'$ has a spiral spring, R, bearing on its upper surface.

The operation is as follows: The team or draft power is attached to the shaft B, and as the machine is drawn along the teeth P cut the back parts of the sod, loosening the soil without disturbing the seed or sod, and the seed in hopper G passes down on plate $i$, the teeth of the bars $l$ serving as agitators and causing the seed to pass through the perforated plates $h$ $i$. The bars $l$ $l$ are operated by the rod H from the crank-pulley I, and the seed as it passes on plate $i$ is not subjected to any pressure from seed above it, as the seed passes out from the hopper onto plate $i$. One great difficulty is thereby avoided—to wit, the liability of the choking and clogging of the seed-distributing apparatus on account of the weight of the superincumbent seed in the hopper. The seed drops from the plate $h$ and falls on the board M, which has a vibrating movement given it from the rod H by the rod I, and this board conveys the seed in an even-spread sheet or layer to the guide-board N, which, when turned as shown in full color in Fig. 1, discharges the seed back of the teeth P, as shown in red; but when the board N is turned as shown in red outline the seed is discharged among the teeth P, and is covered by the same. The latter position of the board N is necessary in sowing large seed, such as peas, &c.; but in sowing small seed, wheat, &c., the former adjustment of board N is used, the drags Q only covering the seed. The drags Q are pressed down by the springs R, so that they will act efficiently, said springs allowing the drags to yield or give bodily under any obstructions that may be in their path, the front ends of the drags rising, as well as the back ends, in consequence of the connection formed by the eyes $f'$ and guides $g$.

Underneath the hopper G there is placed a perforated tubular seed-box, S, which has a perforated slide, T, fitted to it to form a register. (See Fig. 5.) This seed-box may be fitted loosely on a rod, $a^{xx}$, and have a longitudinal vibrating movement given it from the board M for the purpose of sowing, when necessary, grass-seed. A fertilizer or manure distributer, U, may be attached to the back part of frame A.

When the machine is to be drawn from place to place the teeth P $d'$ of the harrow and drag may be elevated above the surface of the ground by depressing the back part of frame D, and the bars $l$ may be stopped at any time by actuating lever K and throwing pinion $p$ out of gear with wheel $q$.

Having thus described my invention, what I claim as new, and desire to secure by Letters Patent, is—

1. The arrangement of the toothed bars $l$ $l$ and perforated plates $h$ $i$ outside or in front of the hopper G, substantially as and for the purpose specified.

2. The adjustable board N, placed relatively with the shake-board M, harrow O, and drags Q, to operate as and for the purpose set forth.

3. The arrangement of the lever-frame D, roller E, bars $b$ $b$, shaft B, and caster-wheels C C, substantially as shown and described, for the purpose set forth.

4. The combination of the vibrating board M, hopper G, with the reciprocating agitators $l$ $l$, the seed-box S, harrow O, drags Q, frame D, with roller E, attached and connected to the shaft B by the rods $b$, all arranged for joint operation as set forth.

J. B. DUANE.

Witnesses:
GILES Y. VAN DE BOGUT,
JOHN M. QUIRK.